(12) United States Patent
Sohmshetty et al.

(10) Patent No.: US 11,879,751 B2
(45) Date of Patent: Jan. 23, 2024

(54) STAND-ALONE INSPECTION APPARATUS FOR USE IN A MANUFACTURING FACILITY

(71) Applicant: Ford Global Technologies, LLC, Dearborn, MI (US)

(72) Inventors: Raj Sohmshetty, Canton, MI (US); Scott Mayberry, East Point, GA (US); Vikas Rajendra, Novi, MI (US); Sam Hoff, Hazel Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 560 days.

(21) Appl. No.: 17/087,936

(22) Filed: Nov. 3, 2020

(65) Prior Publication Data
US 2022/0136872 A1 May 5, 2022

(51) Int. Cl.
| | |
|---|---|
| *G01D 11/24* | (2006.01) |
| *G01D 11/30* | (2006.01) |
| *G01D 11/28* | (2006.01) |
| *G03B 15/05* | (2021.01) |

(52) U.S. Cl.
CPC ............ *G01D 11/24* (2013.01); *G01D 11/28* (2013.01); *G01D 11/30* (2013.01); *G03B 15/05* (2013.01); *G03B 2215/0514* (2013.01); *G03B 2215/0567* (2013.01); *G03B 2215/0575* (2013.01)

(58) Field of Classification Search
CPC ........ G01D 11/24; G01D 11/28; G01D 11/30; G03B 15/05; G03B 2215/0514; G03B 2215/0567; G03B 2215/0575
See application file for complete search history.

(56) References Cited

U.S. PATENT DOCUMENTS

| | | |
|---|---|---|
| 8,217,646 B2 | 7/2012 | Karpen |
| 8,310,533 B2 | 11/2012 | Morse et al. |
| 9,354,670 B2 | 5/2016 | Derosa et al. |
| 9,638,553 B2 | 5/2017 | Coombs et al. |
| 2013/0144416 A1* | 6/2013 | Rataul ............. G05B 19/41865 700/95 |
| 2017/0030877 A1* | 2/2017 | Miresmailli ....... G01N 33/0098 |
| 2020/0322703 A1* | 10/2020 | Bures .................... G06N 20/00 |

\* cited by examiner

*Primary Examiner* — Clayton E. LaBalle
*Assistant Examiner* — Diana Hancock
(74) *Attorney, Agent, or Firm* — Burris Law, PLLC

(57) ABSTRACT

An inspection apparatus includes a portable housing and at least one handle structure integrally formed with the portable housing. The inspection apparatus further includes a vision data system, a lighting system, a user interface system, a wireless communication system, and a controller. The vision data system includes one or more cameras provided on the first face of the portable housing. The vision data system is operable to capture component data. The lighting system is arranged with the vision data system at the first face. The lighting system includes diffused light emitting diode (LED) ring arranged around at least one of the one or more cameras. The manufacturing inspection apparatus is a stand-alone and all-in-one computing device. The manufacturing inspection apparatus processes and stores inspection data locally.

20 Claims, 6 Drawing Sheets

STAND-ALONE INSPECTION APPARATUS FOR USE IN A MANUFACTURING FACILITY

FIELD

The present disclosure relates to an inspection apparatus for inspecting a component in a manufacturing facility.

BACKGROUND

The statements in this section merely provide background information related to the present disclosure and may not constitute prior art.

In manufacturing plants, one or more stationary cameras are used to inspect components as a part of a vision system, which may have inherent limitations as stationary cameras operate with specific orientations. In addition, stationary cameras may not capture components that are hidden by other objects or not in the viewing range of the cameras. Small and inaccessible components at a remote site of manufacturing facilities may result in low inspection performance with stationary cameras.

Furthermore, computing devices configured to inspect components based on data from the cameras may rely on an external system for further processing the data. Some areas of a manufacturing facility may have unreliable wireless communication network causing network connection issues for the computing device trying to provide data to the external system. These and other issues related to inspecting components in a manufacturing facility are addressed by the present disclosure.

SUMMARY

This section provides a general summary of the disclosure and is not a comprehensive disclosure of its full scope or all of its features.

In one form of the present disclosure, a manufacturing inspection apparatus includes a portable housing and at least one handle structure integrally formed with the portable housing such that the handle structure is accessible to secure and carry the portable housing. The portable housing has a first face and a second face opposite to the first face and defines an accessible cavity. The inspection apparatus further includes a vision data system, a lighting system, a user interface system, a wireless communication system, and a controller. The vision data system includes one or more cameras provided on the first face of the portable housing. The vision data system is operable to capture images. The lighting system is arranged with the vision data system at the first face. The lighting system includes a diffused light emitting diode (LED) ring arranged around at least one of the one or more cameras. The user interface system includes a touch-screen display provided at the second face of the portable housing and is configured to receive inputs from the user. The wireless communication system is disposed within the portable housing and configured to wirelessly communicate with an external device. The controller is housed in the cavity of the portable housing and communicably coupled to the vision data system, the lighting system, the user interface system, and the wireless communication system. The controller is configured to process and generate inspection data based on the images from the vision data system as a stand-alone computing node.

In at least one variation, the inspection apparatus also includes a battery system provided at the portable housing and configured to provide power to the controller, the lighting system, the vision data system, the user interface system, the wireless communication module, or a combination thereof. The battery system includes a first battery that is attachable to and detachable from the portable housing and a second battery to provide supplementary power during a battery exchange of the first battery.

In at least one variation, the lighting system further includes a first light intensity control that includes a hardware switch to operate the diffused LED ring and a second light intensity control that includes an input interface provided on the touch-screen display and operable by a user to operate the diffused LED ring. The vision data system includes an infrared camera, a monochrome camera having optical filters, and a multi-chrome camera.

In some variations of the present disclosure, the first battery of the battery system is a rechargeable battery that is configured to be chargeable while being attached to the portable housing and chargeable while being detached from the portable housing. The second battery of the battery system provides power while the first battery is being charged. The first battery and the second battery are disposed within the cavity of the portable housing.

In some variations of the present disclosure, the manufacturing inspection apparatus further includes a plurality of sensors disposed at the portable housing and communicably coupled to the controller. The sensors includes an inertial measurement unit (IMU), a depth sensor, a light sensor, a temperature sensor, a humidity sensor, or a combination thereof.

In some variations of the present disclosure, the manufacturing inspection apparatus further includes an inertial measurement unit (IMU) disposed at the portable housing and communicably coupled to the controller. The IMU includes accelerometer, gyroscope, or magnetometer, or a combination thereof. The controller is configured to determine an orientation of the portable housing based on data from the IMU and prompt to the user, via the user interface system, altering the orientation of the portable housing to capture the image with the vision data system in response to the orientation being misaligned with a desired orientation.

In some variations of the present disclosure, the manufacturing inspection apparatus further includes a plurality of depth sensors. The portable housing further has a third face arranged between the first face and the second face. The depth sensors are provided at the third face and the first face of the portable housing. The controller is configured to determine a distance between the apparatus and an reference point based on data from the depth sensors. The manufacturing inspection apparatus.

In some variations of the present disclosure, the manufacturing inspection apparatus further includes an environment sensor for measuring at least one of a temperature and a humidity. The controller is configured to monitor environmental conditions about the inspection apparatus based on data from the environment sensor.

In some variations of the present disclosure, the user interface system further comprises an audio system having speakers and microphones disposed at the portable housing. The portable housing further comprises a mounting interface to mount the portable housing on to a support structure. The lighting system is configured to provide different wavelengths of light as the vision data system captures the image.

In another form of the present disclosure, a portable inspection apparatus includes a housing including a handle structure, and various modules. For instance, the portable inspection apparatus includes an on-board controller module, a vision data acquisition module, a lighting module, a sensor module, a user interface module, a wireless communication module, and a battery module. The on-board controller module is housed in the housing and includes a processor and a memory for storing instructions. The vision data acquisition module is arranged with the housing and configured to capture images. The lighting module is arranged adjacent to the vision data acquisition module with the housing and configured to adjust intensity of light for operation of the vision data acquisition module. The sensor module is disposed with the housing and includes a light sensor, an inertial measurement unit (IMU), and a distance sensor. The user interface module is disposed at the housing and configured to receive an input and display an output. The on-board controller module is communicatively coupled to the vision data acquisition module, the lighting module, the sensor module, the user interface module, and the wireless communication module. The on-board controller module is configured to: (i) process the image captured from the vision data acquisition module and generate inspection data as a stand-alone computing node without communication with and processing at a central node, (ii) process measurement data from the sensor module to determine at least one of light intensity of surrounding, orientation, and distance between the housing an external reference point, (iii) control intensity of light generated from the lighting modules based on the light intensity of the surrounding, control positional orientation of the housing based on the determined orientation, control the distance between the housing and the external reference point to a desired distance based on the determined distance, or a combination thereof; and (iv) transmit inspection data via the wireless communication module to a central server node upon request. The on-board controller module is configured to be removably coupled to the housing.

A manufacturing inspection system according to the present disclosure is a portable compact design that accommodates several components to make it a stand-alone system.

In some variations of the present disclosure, the portable inspection apparatus further includes a modular component that is plugged into the housing and communicates with the on-board controller module upon the plug-in.

In some variations of the present disclosure, the light module includes a light sensor, and a diffused light emitting diode (LED) ring arranged to surround the vision data acquisition module. The lighting module further includes a first light intensity control that includes a hardware switch to control first intensity of light and a second light intensity control that includes an input interface provided on the user interface module and operable by a user to control second intensity of light.

In some variations of the present disclosure, the vision data acquisition module includes an infrared camera, a monochrome camera having optical filters, and a multichrome camera. The vision data acquisition module is configured to use different wavelengths of light output from the lighting module in an image or video acquisition process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
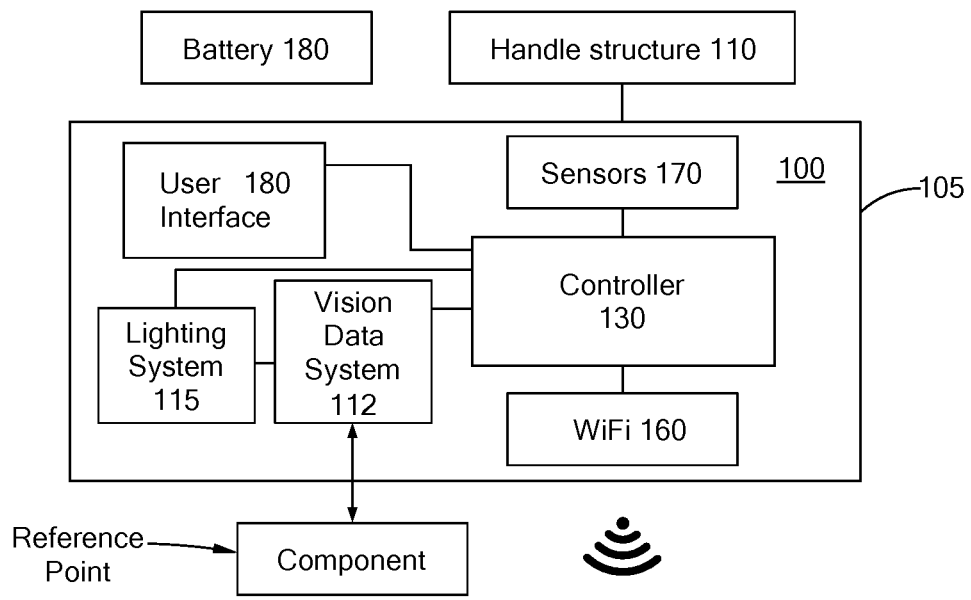
FIG. 1 is a block diagram of a manufacturing inspection apparatus according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A manufacturing inspection apparatus according to the present disclosure is a stand-alone and all-in-one computing device. The manufacturing inspection apparatus processes inspection data independently and provides the inspection data to another computing systems upon request. The manufacturing inspection apparatus is portable and easy to transport to a remote site of manufacturing facilities. Due to the portable size, the manufacturing inspection apparatus is accessible to collect data about a small component, or a component that is hidden by other large object(s). Within manufacturing facilities, while a network connection may not be available at a remote site, the manufacturing inspection apparatus is stand-alone and can process inspection data without using processing resource at a central server, or other systems.

The manufacturing inspection apparatus according to the present disclosure operates as an independent computing system. A manufacturing facility is associated with a network of computing nodes including a central node and geographically or network wise distributed nodes around the manufacturing facilities. The manufacturing inspection apparatus may handle processing needs as one of edge nodes to which the manufacturing inspection apparatus belongs or is assigned. The manufacturing inspection apparatus can also serve as a server to provide processed inspection data to a central system or other nodes upon request.

The manufacturing inspection apparatus according to the present disclosure includes all-in-one features such that various functions can be performed internally and independently without using external components and/or resources. The manufacturing inspection apparatus has modular features such that components can be removably coupled. Additionally, one or more components can be inserted or removed and operate upon plug-in. The size and design of the edge inspection system are configured to accommodate a portable battery to power the entire system.

The manufacturing inspection apparatus further includes one or more handle structures for holding, using and carrying the apparatus to and in a manufacturing site. The handle structures are positioned to be easily accessible and at the same time without covering a user interface system. This may allow a user to hold and operate the manufacturing inspection apparatus with ease.

The manufacturing inspection apparatus further includes various sensors such as a light sensor, a motion sensor, a humidity sensor, an environment sensor, etc. The manufacturing inspection apparatus further includes various user interface systems including a touch panel, speakers, a voice-activated input, etc.

Referring to the drawings, one or more forms of the manufacturing inspection apparatus according to the present disclosure and their variations are described in detail.

Figure 5A:
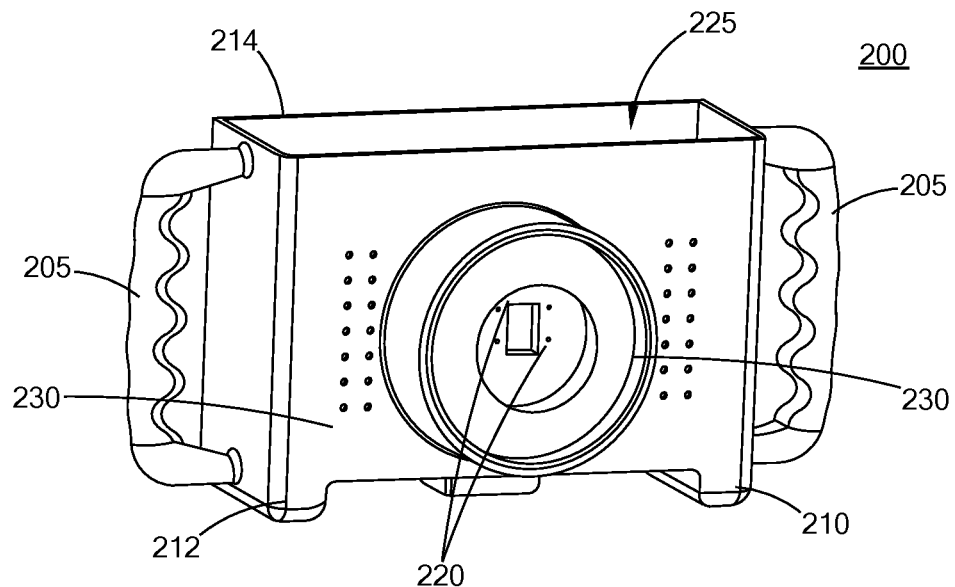
FIG. 5A is a perspective view of one form of the manufacturing inspection apparatus according to the teachings of the present disclosure.

Referring to FIG. 1, a manufacturing inspection apparatus 100 includes a portable housing 105 and a handle structure 110. The portable housing 105 has a first face and a second face opposite to the first face (as shown in FIG. 5A) and defines an accessible cavity. Some examples of the portable housing 105 are illustrated in FIGS. 5A through 5D and FIGS. 6A through 6D. The handle structure 110 is accessible to secure and carry the portable housing 105. In at least one variation, the handle structure 110 is integrally formed with the portable housing 105, but the present disclosure is not limited thereto. In another variation, the portable housing 105 further comprises a mounting interface to mount the portable housing on to a support structure, as shown in and described in connection with FIG. 5D.

As shown in FIG. 1, the inspection apparatus 100 further includes a vision data system 112, a lighting system 115, a user interface system 150, a wireless communication system (WCS) 160, and sensors 170. The inspection apparatus 100 further includes a controller 130. The controller 130 is communicatively coupled to the vision data system 112, the lighting system 115, the user interface system 150, the wireless communication system 160, and the sensors 170. The controller 130 is configured to process component data and generate inspection data based on the component data as a stand-alone computing node.

Component data is based on and is associated with a component in a manufacturing facility that is undergoing inspection, such as a manufactured part, a manufacturing cell, among others. For example, the component includes electrical connectors, clips, wire harness, fuel lines, brake lines, etc. In some forms, component data includes image data and/or video data captured and collected by the vision data system 112. In other forms, component data may include data based on physical properties and/or operational properties such as sound, light, etc. Inspection data is based on an analysis/processing of the component data, such as but not limited to, an analysis of image data and/or video data provided by the vision data system 112 to identity regions of the component captured and provided by the vision data system 112. In other forms, inspection data may include data transmitted from another inspection apparatus, or a central system via the wireless communication system 160.

Figure 2:
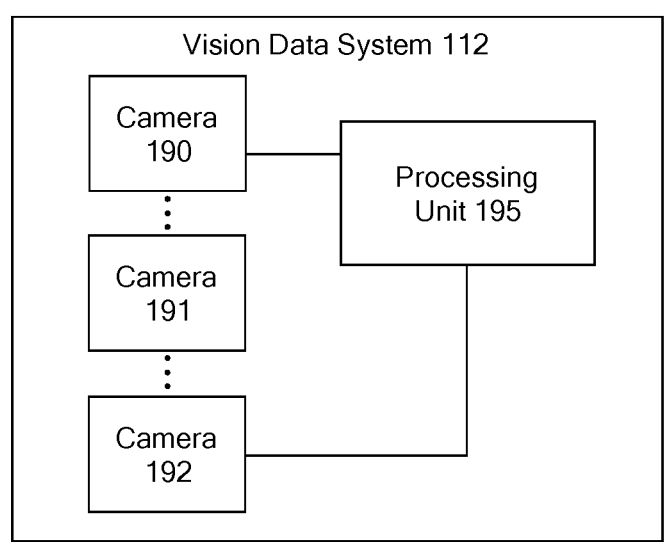
FIG. 2 is a block diagram of a vision data system of the manufacturing inspection apparatus according to the teachings of the present disclosure

Referring to FIG. 2, the vision data system 112 is described in detail. FIG. 2 is a block diagram of the vision data system 112 according to the teachings of the present disclosure. The vision data system 112 includes one or more cameras 190, 191 and 192 provided on the first face of the portable housing 105. The cameras 190 are examples of a vision data system. In some form, the vision data system may be referred to as a vision data acquisition module as the vision data system acquires data relating to components. The vision data system 112 is operable to capture images of one or more components and generate component data. A number of cameras 190 may vary based on multiple factors, such as a number of components to be captured in an image/video, the size of a field-of-view to be captured by the cameras 190, 191 and 192, a level of inspection (e.g., expected numbers of defects in components, a frequency of inspection, etc.), and/or dimensional constraints associated with the inspection apparatus 100, among other factors. In at least one variation, the cameras 190, 191 and 192 includes an infrared camera, a monochrome camera having optical filters, and/or a multi-chrome camera. When the monochrome camera is used, optical filters may be used for a particular spectrum image acquisition. The optical filters are optional and can be used as needed. In some forms, the cameras 190, 191 and 192 include high resolution camera. The cameras 190, 191 and 192 are modular and can be detachably coupled to the controller 130 of the inspection apparatus 100 via a universal standard bus (USB) port and once a plug-in, the cameras 190, 191 and 192 are communicatively coupled to the controller 130.

Figure 3:
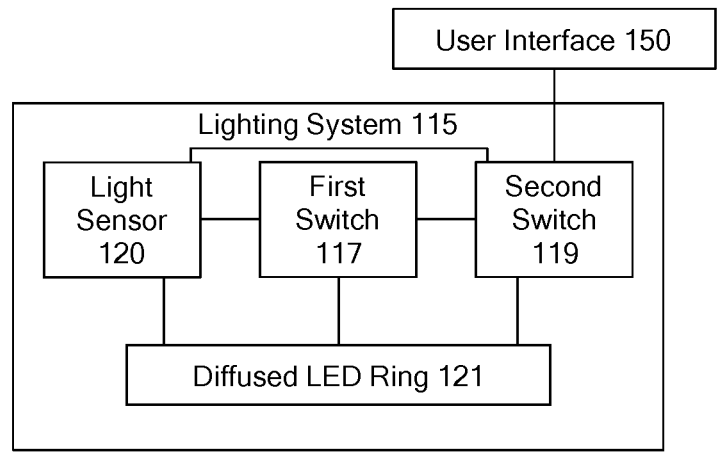
FIG. 3 is a block diagram of a lighting system of the manufacturing inspection apparatus according to the teachings of the present disclosure.

FIG. 3 is a block diagram of the lighting system 115 according to the teachings of the present disclosure. The lighting system 115 is arranged with the vision data system 112 and includes a light sensor 120, switches 117, 119 coupled to the light sensor 120. In at least one variation, a first switch 117 includes a first light intensity control that includes a hardware switch and a second switch 119 includes a second light intensity control. In another variation, the first switch 117 is a physical slide switch to control the intensity. In one variation, the second switch 119 is a touch switch that adjusts light intensity. In another variation, the second switch 119 is implemented with software. As shown in FIG. 3, the second switch 119 is coupled to the user interface 150 which is configured to display the touch switch.

In some forms, the lighting system 115 includes a diffused light emitting diode (LED) ring 121 arranged adjacent to the cameras 190, 191 and 192 of the vision data system 112. In other forms, the lighting system 115 includes a different type of lighting sources and is not limited to the diffused LED ring 121. For example, the diffused LED ring 121 is disposed around the cameras 190 which are provided at the center. The diffused LED ring 121 is configured to emit light needed or desired for the cameras 190 particularly when poor lighting is present. Such lighting can improve image quality provided by the vision data system 112 and overall inspection quality and performance may improve. In some forms, the diffused LED ring 121 provide multi-spectrum lighting. Different wavelengths of light, if provided, allow the vision data system 112 to perform more nuanced image acquisition. For instance, green light may be used for surface detection, and infrared radiation can be used for transparent components such as reflective cellophane.

In one form, in operation, the light sensor 120 detects lighting conditions in actual settings of manufacturing sites.

Data indicative of actual light conditions are sent to the controller 130 and compared with a predetermined data or threshold for the intensity of light. Differences between the actual intensity of light and a preset threshold may indicate that more lighting is needed or desirable for operation of the vision data system 112. Differences between actual conditions and the predetermined intensity of light are sent to the first switch 117, the second switch 119, or both in order to adjust the intensity of light of the diffused LED ring 121. As shown in FIG. 3, the first switch 117 and the second switch 119 are coupled to the diffused LED ring 121 such that the intensity of light output from the diffused LED ring 121 is adjusted. As the intensity of light is adjusted to accommodate the actual lighting conditions, the vision data system 112 can capture component data in the optimal conditions and accuracy of the component data may improve. In addition, the diffused LED ring 121 can be directly operated by a user via the first switch 117 and the second 119.

Referring back to FIG. 1, the manufacturing inspection apparatus 100 includes the user interface system 150. The user interface system 150 includes a touch-screen display provided at the second face of the portable housing 105 (e.g., FIGS. 5B and 6A) and is configured to receive input from a user. In at least one variation, the user interface system 150 further includes a voice-activated input system that responds to voice commands from users. In some variations, the user interface system 150 further includes an audio system having speakers and microphones disposed at the portable housing 105 to, for example, provide alert messages, request an input, receive instructions, among other audio exchanges. In another variation, the user interface system 150 may capture operation sounds of a component, as component data, and the controller 130 processes the operation sounds to determine anomaly of that component.

In FIG. 1, the wireless communication system (WCS) 160 is disposed within the portable housing 105 and configured to wirelessly communicate with an external device. The wireless communication system 160 operates with the controller 130 to transmit to and receive data from other computing systems operating in manufacturing facilities, or at other locations. In some manufacturing sites, wireless connection may not be available. However, the manufacturing inspection apparatus 100 is a stand-alone computing and processing system that can process and store inspection data locally onboard.

Figure 5B:
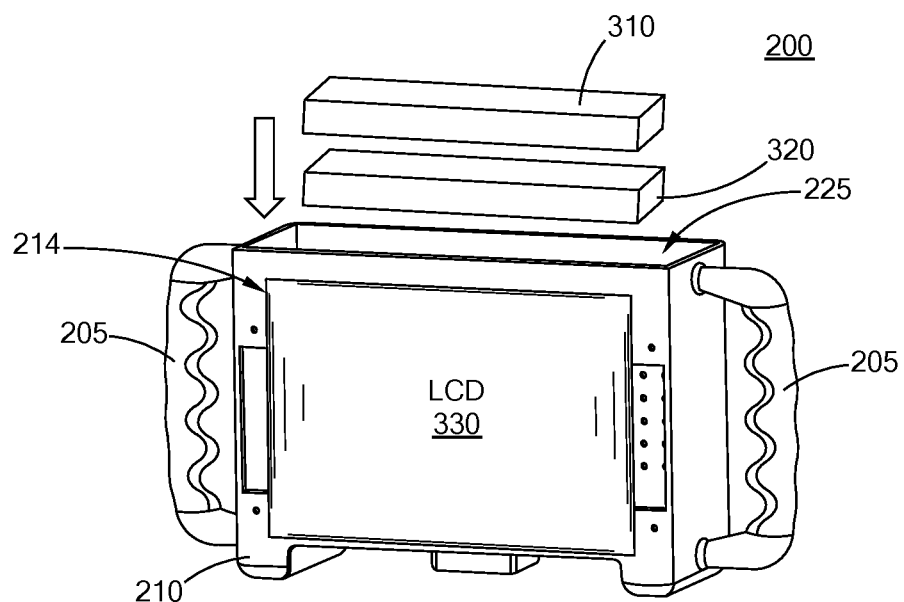
FIG. 5B is another perspective view of the manufacturing inspection apparatus of FIG. 5A.

The inspection apparatus 100 also includes a battery system 180 provided at the portable housing 105 and configured to provide power to the controller 130, the lighting system 115, the vision data system 112, the user interface system 150, the wireless communication system 160, or a combination thereof. In one form, the battery system 180 includes a first battery that is attachable to and detachable from the portable housing 105 and a second battery to provide supplementary power during a battery exchange of the first battery. FIG. 5B illustrates one example of two batteries used in the inspection apparatus 100.

In some forms, the battery 180 is hot swappable and allows the manufacturing inspection apparatus 100 to keep running without any downtime. For instance, while a user is manually swapping an old battery with a new battery, an on-board battery keeps the inspection apparatus 100 running during the battery swap.

The controller 130 is housed in the cavity of the portable housing 105 and communicably coupled to the vision data system 112, the lighting system 115, the user interface system 150, and the wireless communication system 160. The controller 130 is configured to process component data and generate inspection data based the component data as a stand-alone computing node. In some forms, the component data includes images taken from components by the vision data system 112. The controller 130 may store inspection logs, results, and other data locally and can be synced to a central in-house network of the manufacturing facilities. Such data can be transported over wifi if the inspection apparatus 100 is connected, or an operator can retrieve a hard drive upon notification and upload through a wired connection.

In some forms, the controller 130 may incorporate Artificial Intelligence (AI) frameworks for performing one or more inspections such as vision inspection, audio inspection, and/or among other inspections. The AI frameworks may run on the controller 130 without using or requiring heavy processing load. Alternatively, the controller 130 may incorporate traditional inspection algorithms for vision inspection, audio inspection, and/or other inspection techniques.

In other forms, two or more inspection apparatuses can be used at the same time to cover the same or neighboring sites. These inspection apparatuses may communicate with one another and form a complete mobile inspection device platform.

In some forms, the controller 130 is modular and an on-board processing device. The manufacturing inspection apparatus 100 further includes a memory card or additional USB drives to store data locally. In one variation, the manufacturing inspection apparatus 100 operates to periodically sync locally stored data to a main network and update and permanently store data.

Figure 4:
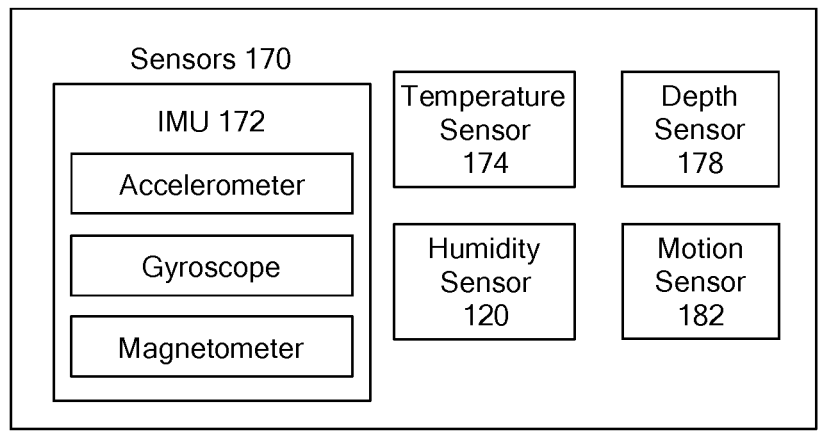
FIG. 4 is a block diagram of sensors of the manufacturing inspection apparatus according to the teachings of the present disclosure.

With reference to FIG. 1 and FIG. 4, the inspection apparatus 100 further includes the sensors 170. In some variations, the sensors 170 includes a plurality of sensors disposed at the portable housing 105 and communicably coupled to the controller 130. In one or more variations, the sensors 170 includes an inertial measurement unit (IMU) 172, a temperature sensor 174, a humidity sensor 176, a depth sensor 178, and/or a motion sensor 182. It should be readily understood that the sensors 170 may include other sensors and should not be limited to the sensors provided.

In one variation, the IMU 172 is disposed at the portable housing 105 and includes accelerometer, gyroscope, and/or magnetometer. The controller 130 is configured to determine an orientation of the portable housing 105 based on data from the IMU 172. If the orientation of the portable housing 105 is misaligned with a desired orientation to, for example, capture component data with the vision data system 112, the controller is configured to alert a user via the user interface system 150 of the misalignment and provide guidance on the desired orientation. Accordingly, the user can position the inspection apparatus 100 as needed.

In one form, the depth sensor 178 is arranged about the portable housing 105 to measure a distance to a reference point. For example, a depth sensor is provided at a third face of the portable housing 105 and at the first face of the portable housing 105, where the third face is a face of the inspection apparatus 100 that is the closest to component. The controller 130 is configured to determine a distance between the apparatus 100 and a reference point based on data from the depth sensors 178. Based on the determined distance, the controller 130 may prompt a user, via the user interface 150, relevant messages or instructions for adjusting the distance in order to have more accurate component data. As shown in FIG. 1, the reference point is provided at a surface of the component.

The temperature sensor 174 and the humidity sensor 120 are provided as environment sensor for measuring a temperature, a humidity, or both. In at least one variation, the controller 130 is configured to monitor environmental conditions about the inspection apparatus 100 based on data from the environment sensor. In another variation, the environment sensors are arranged to have the controller 130 monitor environmental conditions about components.

The motion sensor 182 is configured to detect a motion, such as but not limited to, motion of a component, of a user, and/or of the inspection apparatus 100. Different types of sensors or various other sensors can be used per different requirements for different use cases. Data from the motion sensor 182 is provided to the controller 130 for monitoring motion of a selected object. As the inspection apparatus 100 has a modular design, it can accommodate addition and removal of different sensors.

FIGS. 5A through 5D illustrate one form of a portable inspection apparatus 200 according to the present disclosure. The portable inspection apparatus 200 includes a housing 210 having a handle structure 205. As shown in FIG. 5A, the handle structure 205 is round edged and allows a user to comfortably hold the portable inspection apparatus 200. At the same time, a user can access and use different modules formed and arranged in the housing 210 without the handles 205 interfering. When a user is performing inspection tasks at a remote site of manufacturing sites, the portable housing 210 and the handles 205 provide improved convenience in using the inspection apparatus 200.

The portable inspection apparatus 200 includes a first face 212 and a second face 214 opposite of the first face 212. On the first face 212, a vision data acquisition module 220 and a lighting module 230 are arranged. On the second face 214, a user interface module as shown in FIG. 5B is arranged.

The portable inspection apparatus 200 has various modular components. In some variations, the portable inspection apparatus 200 includes an on-board controller module 250, the vision data acquisition module 220, the lighting module 230, a sensors module 270, a user interface module provided as a liquid crystal display 330, a wireless communication module, and a battery module 310, 320. The on-board controller module 250 is housed in the housing 210 and includes a processor and a memory for storing instructions. In some forms, the processor can be trained to perform AI based processing such as AI based image recognition. AI based processing that may be performed in the inspection apparatus 200 may not require very complex, high processing load training. Rather, AI based processing involves lightweight training and processing to perform inspection tasks.

As shown in FIG. 5A, the vision data acquisition module 220 is arranged with the housing 210 and configured to capture component data. For instance, the vision data acquisition module 220 includes one or more high resolution cameras. In some variations, the vision data acquisition module 220 includes an infrared camera, a monochrome camera having optical filters, and/or a multi-chrome camera. In another variation, the vision data acquisition module 220 is configured to use different wavelengths of light output from the lighting module in an image or video acquisition process. The positioning of cameras may vary depending on use cases of the inspection apparatus 200. Although FIG. 5A shows that the vision data acquisition module 220 is located at the center of the apparatus, the present disclosure is not limited to the center position. As shown in FIG. 6D, a vision data acquisition module 930 may be located toward one lateral edge. The vision data acquisition module 220 captures images or video from components and provides such data to the on-board processing module.

The lighting module 230 is arranged adjacent to the vision data acquisition module 220 with the housing 210 and configured to adjust intensity of light for operation of the vision data acquisition module 220. As shown in FIG. 5A, the lighting module 230 surrounds the vision data acquisition module 220 and provide light for operation of the vision data acquisition module 220. The lighting module 230 includes a light sensor (not shown) that detects actual intensity of light in the surrounding. The lighting module 230 further includes a light switch in a hardware switch, or a touch operated switch bar on the user interface 330 to adjust brightness in the surrounding, as shown in FIGS. 1 and 3. Accordingly, the vision data acquisition module 220 may capture component data with improved accuracy even though the surrounding is too bright or too dark.

In one form, on the first face 212, the apparatus 200 includes a diffused lighting holder 230 in the lighting module 230. As shown in FIG. 5A, the diffused lighting holder 230 has a ring shape and is arranged to surround the vision data acquisition module 220. The diffused lighting holder 230 is further coupled to a first light intensity control (not shown in FIG. 5A) that includes a hardware switch to control first intensity of light and a second light intensity control that includes a software implemented switch as described above in connection with FIG. 3.

FIG. 5B illustrates the user interface module as including the LCD 330 that is disposed at the second face 214 of the housing 210. The LCD 330 is a touch panel and configured to receive an input and display an output. The size of the user interface module can vary and may not occupy the second face 214 of the manufacturing inspection apparatus 200 as shown in FIG. 5B. In other words, the inspection apparatus 220 may include a smaller display. Additionally, or alternatively, the inspection apparatus 220 further includes a voice-activated user interface and the LCD touch panel can be omitted, as shown in FIG. 6D.

In some variations of the present disclosure, the inspection apparatus 200 includes a first battery 310 and a second battery 320, as the battery module (see FIG. 5B). In this form, the first battery 310 is a rechargeable battery that is configured to be chargeable while being attached to the portable housing 105 and chargeable while being detached from the portable housing 210. The second battery 320 of the battery system provides power while the first battery 310 is being charged. The first battery 310 and the second battery 320 are disposed within the cavity of the portable housing 210, as shown in FIG. 5B. AI so, the first battery 310 and the second battery 320 can be removed from the cavity of the housing 210. While the first battery 310 is removed and replaced with another battery, the second battery 320 remains in the housing 210 and powers the components of the portable inspection apparatus 200.

Figure 5C:
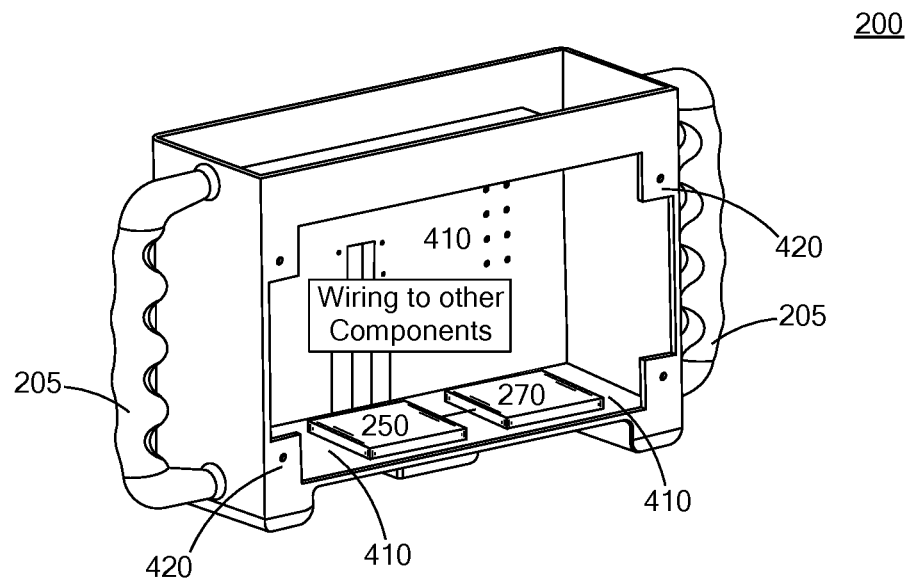
FIG. 5C is a perspective view of a cavity of the manufacturing inspection apparatus of FIG. 5A.

As shown in FIG. 5C, the portable inspection apparatus 200 is reconfigurable by inserting or removing a modular component into a cavity 410 of the housing 210. When the modular component is plugged into the housing 210, the modular component communicates with the on-board controller module 250 upon the plug-in and may not generally require special set-up.

As shown in FIG. 5C, the on-board controller module 250 is housed in the cavity 410 and communicatively coupled to the vision data acquisition module 220, the lighting module 230, the sensor module 270, the user interface module 330, and the wireless communication module. The on-board controller module 250 is configured to be removably coupled to the housing 210. In other words, the on-board controller module 250 is completely modular and insertable, removable and replaced with another controller module.

The on-board controller module 250 is configured to process component data including images or videos captured from the vision data acquisition module 220. The on-board controller module 250 processes the component data and generates inspection data as a stand-alone computing node without communication with and processing at a central node. The on-board controller module 250 processes measurement data from the sensor module to determine at least one of light intensity of surrounding, orientation, and distance between the housing an external reference point. The on-board controller 250 controls intensity of light generated from the diffused lighting holder 230 based on the light intensity of the surrounding, controls positional orientation of the housing based on the determined orientation, controls the distance between the housing and the external reference point to a desired distance based on the determined distance, or a combination thereof. The on-board controller module transmits inspection data via the wireless communication module (not shown) to a central server node upon request.

Figure 5D:
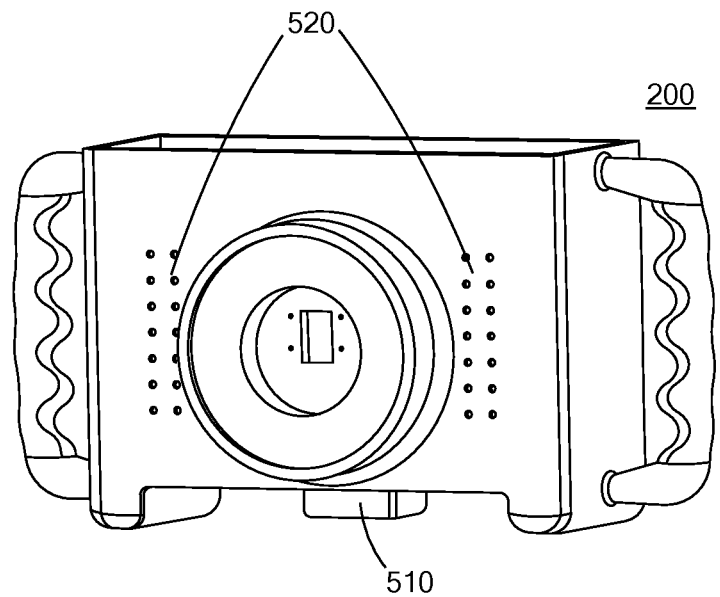
FIG. 5D is a perspective view of the manufacturing inspection apparatus having a speaker and a universal tripod mount of FIG. 5A.

FIG. 5C also illustrates a display panel mounting structure 420 that is configured to accommodate the LCD 330 and provide a detachable interface to the housing 210. FIG. 5D illustrates a universal tripod mount 510 for mounting the inspection apparatus 200 on a tripod during operation. The universal tripod mount 510 is one example and the inspection apparatus 200 may include another structure replacing the tripod mount 510, or in addition to the tripod mount 510. For example, the inspection apparatus 200 may be mounted on a flat surface, on a raised surface, hanging in from a ceiling, or installed on a wall. Accordingly, a support structure for a wall mount, a ceiling mount, etc. can be provided to the inspection apparatus 200.

FIG. 5D further illustrates structures 520 that accommodate speakers for audio feedback. As discussed above, the inspection apparatus 200 may further include a voice-activated user interface and prompt or alert warning, instructions, feedback to a user via speakers.

By way of example only, dimensions of the portable inspection apparatus 200 according to the teachings of the present disclosure are 11" wide, 5.5" high, and 3" deep. A top opening that leads to a cavity of the inspection apparatus 200 may have about 8" width. A diameter of a circular ring that corresponds to the lighting system is 3.5". These dimensions illustrate the portable and compact size of the inspection apparatus 200 and the inspection apparatus of the present disclosure may have different dimensions. The portable inspection apparatus 200 has a portable compact design but it is a stand-alone system that processes inspection data without using external processing resources.

Figure 6A:
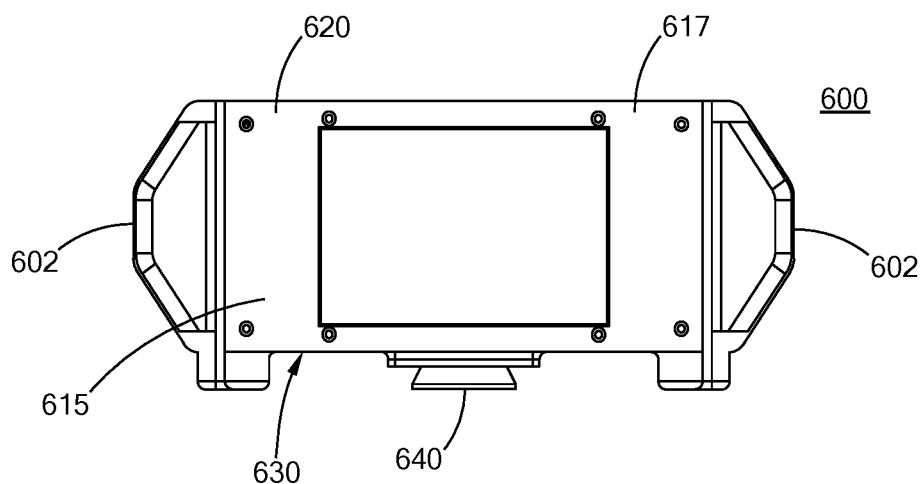
FIG. 6A is a perspective view of another form of the manufacturing inspection apparatus according to the teachings of the present disclosure.
Figure 6B:
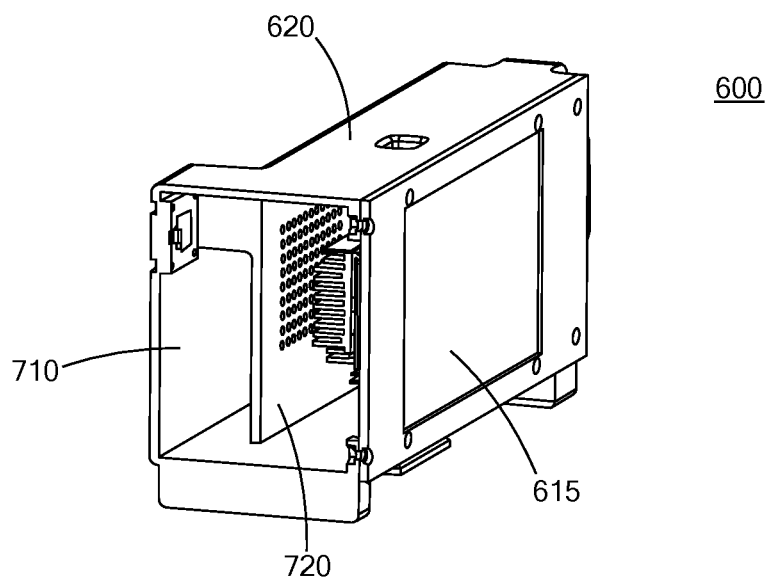
FIG. 6B illustrates one lateral side of the manufacturing inspection apparatus of FIG. 6A.
Figure 6C:
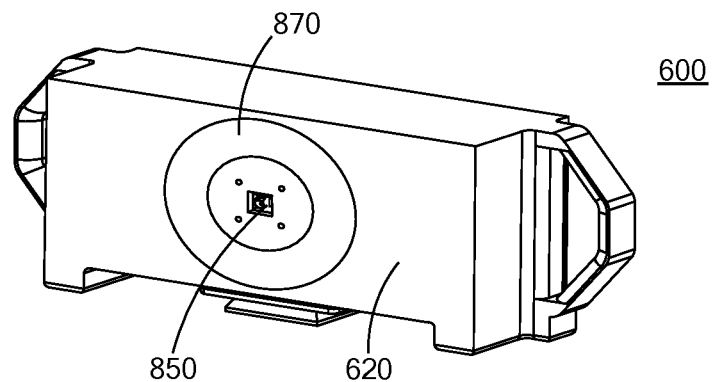
FIG. 6C is another perspective view of the manufacturing inspection apparatus of FIG. 6A.
Figure 6D:
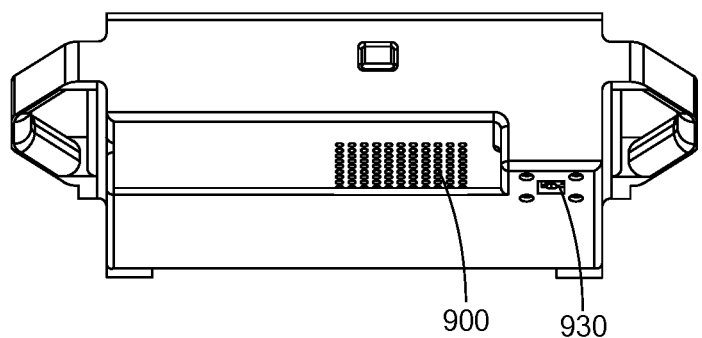
FIG. 6D illustrates another variation of the manufacturing inspection apparatus of FIG. 6A.

FIGS. 6A-6C illustrate yet another form of a portable inspection apparatus 600 according to the present disclosure. The portable inspection apparatus 600 includes a housing 620 and a pair of handles 602 attached on lateral sides of the housing 620. On a first face 615, a display for user interface is arranged. The inspection apparatus 600 further includes a second face 620 which will be described more in detail in FIG. 6C below. The handles 602 have ergonomic structures that allow a user to easily grab and secure the inspection apparatus 600 even with one hand. At the same time, a user operates various modules of the inspection apparatus 600. At a third face 630, a mounting structure 640 is disposed such that the portable inspection apparatus 600 can be mounted to another structure upon need. For example, the mounting structure 640 is arranged on a flat surface or a tripod structure. In other variations, the mounting structure 640 may be omitted.

FIG. 6B illustrates a lateral side of the portable inspection apparatus 600 that includes cavities 710, 720. The portable inspection apparatus 600 uses the cavities 710, 720 as spaces for accommodating various modular components.

FIG. 6C illustrates the second face 620 of the portable inspection apparatus 600 which includes parts for a vision data system 850 and a lighting system 870 arranged to surround the vision data system 850. As discussed above in connection with FIG. 3 and FIG. 5A, the lighting system 870 provides sufficient lighting for the vision data system 850 to operate in an optimal condition and capture the improved quality of component data.

Dimensions of the portable inspection apparatus 600 may be similar to the dimensions of the portable inspection apparatus 200. By way of example only, dimensions of the portable inspection apparatus 200 according to the teachings of the present disclosure are 10"~20" wide, 5"-10" high, and 3"-5" deep. The size of the portable inspection apparatus 600 is not limited thereto and various sizes are available based on use cases.

FIG. 6D illustrates another variation of the portable inspection apparatus 600 having a different first face. In this form, a user interface module such as a LCD panel is omitted and instead, an audio system 900 is arranged. As discussed above, the audio system 900 can receive user's input and feedback and output messages, alerts, results, warning, etc. The audio system 900 may be more desirable and needed depending on manufacturing conditions.

The manufacturing inspection apparatuses described above according to the teachings of the present disclosure may be implemented with low manufacturing cost. The manufacturing inspection apparatuses can be used for inspection of small components and replace manual visual inspection. The manufacturing inspection apparatuses may assist users and operators in improving the accuracy and speed in identifying faulty components even though such components are hard to observe or hidden behind other panels or components. The portability of the manufacturing inspection apparatuses enable access and inspection of smaller or obscured components.

The manufacturing inspection apparatuses described above according to the teachings of the present disclosure have the modular design to add and remove features with ease. The sensors onboard can be tailored for specific use cases, in order to adjust the orientation, the position, the lighting conditions, the temperature, humidity, the conditions of the inspection apparatuses, and the health conditions of operators.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A manufacturing inspection apparatus comprising:
a portable housing having a first face and a second face opposite to the first face and defining an accessible cavity;
a vision data system including one or more cameras provided on the first face of the portable housing, wherein the vision data system is operable to capture at least images;
a lighting system arranged with the vision data system on the first face, wherein the lighting system includes a diffused light emitting diode (LED) ring arranged around at least one of the one or more cameras;
a user interface system comprising a touch-screen display provided at the second face of the portable housing and configured to receive an input from the user;
a wireless communication system disposed within the portable housing and configured to wirelessly communicate with an external device;
a controller housed in the cavity of the portable housing and communicably coupled to the vision data system, the lighting system, the user interface system, and the wireless communication system, wherein the controller is configured to process and generate inspection data based on the images from the vision data system as a stand-alone computing node; and
at least one handle structure integrally formed with the portable housing such that the handle structure is accessible to secure and carry the portable housing without covering the touch screen or the vision data system.

2. The apparatus of claim 1, wherein the lighting system further includes a first light intensity control that includes a hardware switch to operate the diffused LED ring and a second light intensity control that includes an input interface provided on the touch-screen display and operable by a user to operate the diffused LED ring.

3. The apparatus of claim 1, wherein the vision data system comprises at least one of:
an infrared camera,
a monochrome camera having optical filters, or
a multi-chrome camera.

4. The apparatus of claim 1, further comprising:
a battery system provided at the portable housing and configured to provide power to the controller, the lighting system, the vision data system, the user interface system, the wireless communication module, or a combination thereof, and
wherein the battery system includes a first battery that is attachable to and detachable from the portable housing and a second battery to provide supplementary power during a battery exchange of the first battery.

5. The apparatus of claim 4, wherein:
the first battery of the battery system is a rechargeable battery that is configured to be chargeable while being attached to the portable housing and chargeable while being detached from the portable housing; and
the second battery of the battery system provides power while the first battery is being charged.

6. The apparatus of claim 4, wherein the first battery and the second battery are disposed within the cavity of the portable housing.

7. The apparatus of claim 1 further comprising a plurality of sensors disposed at the portable housing and communicably coupled to the controller, wherein the sensors includes an inertial measurement unit (IMU), a depth sensor, a light sensor, a temperature sensor, a humidity sensor, or a combination thereof.

8. The apparatus of claim 1 further comprising:
a light sensor disposed at the portable housing and communicably coupled to the controller, wherein the light sensor detects intensity of light of a surrounding, and
wherein the controller is configured to adjust the diffused LED ring to compensate differences between the intensity of light of the surrounding and a selected threshold intensity of light selectable by the user by way of the user interface system.

9. The apparatus of claim 1 further comprising:
an inertial measurement unit (IMU) disposed at the portable housing and communicably coupled to the controller, wherein the IMU includes accelerometer, gyroscope, or magnetometer, or a combination thereof, and
wherein the controller is configured to determine an orientation of the portable housing based on data from the IMU and prompt to the user, via the user interface system, altering the orientation of the portable housing to capture the image with the vision data system in response to the orientation being misaligned with a desired orientation.

10. The apparatus of claim 1 further comprising a plurality of depth sensors, wherein the portable housing further has a third face arranged between the first face and the second face, wherein the depth sensors are provided at the third face, the first face, or both of the portable housing, wherein the controller is configured to determine a distance between the apparatus and a reference point based on data from the depth sensors.

11. The apparatus of claim 10, wherein the reference point is on or adjacent to an object.

12. The apparatus of claim 11, wherein the vision data acquisition module comprises:
an infrared camera;
a monochrome camera having optical filters; and
a multi-chrome camera;
wherein the vision data acquisition module is configured to use different wavelengths of light output from the lighting module in an image or video acquisition process.

13. The apparatus of claim 1 further comprising an environment sensor for measuring at least one of a temperature and a humidity, wherein the controller is configured to monitor environmental conditions about the inspection apparatus based on data from the environment sensor.

14. The apparatus of claim 1, wherein the user interface system further comprises an audio system having speakers and microphones disposed at the portable housing.

15. The apparatus of claim 1, wherein the portable housing further comprises a mounting interface to secure the portable housing to a support structure.

16. The apparatus of claim 1, wherein the lighting system is configured to provide different wavelengths of light as the vision data system captures the image.

17. A portable inspection apparatus comprising:
a housing including a handle structure, wherein the handle structure is integrally formed with the housing;
an on-board controller module housed in the housing and comprising a processor and a memory for storing instructions;
a vision data acquisition module arranged with the housing and configured to capture images;

a lighting module arranged adjacent to the vision data acquisition module with the housing and configured to adjust intensity of light for operation of the vision data acquisition module;

a sensor module disposed with the housing and comprising a light sensor, an inertial measurement unit (IMU), and a distance sensor;

a user interface module disposed at the housing and configured to receive an input and display an output;

a wireless communication module; and a battery module, wherein:

the on-board controller module is communicatively coupled to the vision data acquisition module, the lighting module, the sensor module, the user interface module, and the wireless communication module, and the on-board controller module is configured to:

process the image captured from the vision data acquisition module and generate inspection data as a stand-alone computing node without communication with and processing at a central node, process measurement data from the sensor module to determine at least one of light intensity of surrounding, orientation, and distance between the housing an external reference point, control intensity of light generated from the lighting modules based on the light intensity of the surrounding, control positional orientation of the housing based on the determined orientation, control the distance between the housing and the external reference point to a desired distance based on the determined distance, or a combination thereof; and transmit inspection data via the wireless communication module to the central server node upon request;

wherein the on-board controller module is configured to be removably coupled to the housing.

18. The apparatus of claim 17, further comprising a modular component that is plugged into the housing and communicates with the on-board controller module upon the plug-in.

19. The apparatus of claim 17, wherein the lighting module comprises:

a light sensor; and a diffused light emitting diode (LED) ring arranged to surround the vision data acquisition module.

20. The apparatus of claim 19, wherein the lighting module further comprises:

a first light intensity control that includes a hardware switch to control first intensity of light; and a second light intensity control that includes an input interface provided on the user interface module and operable by a user to control second intensity of light.

* * * * *